3,211,781
PRODUCTION OF E-AMINOCAPROIC ACID ESTERS FROM E-AMINOCAPROLACTAM
Bernard Taub, Williamsville, and John B. Hino, Buffalo, N.Y., assignors to Allied Chemical Corporation, New York, N.Y., a corporation of New York
No Drawing. Filed Oct. 28, 1960, Ser. No. 65,614
5 Claims. (Cl. 260—482)

This invention relates to a novel method for the preparation of amino acid esters that is, esters of amino carboxylic acids. More particularly, it relates to a novel method for the preparation of E-aminocaproic acid esters from E-caprolactam ("E" being employed herein, including the claims, to represent "epsilon").

The production of the ethyl ester of E-amino-caproic acid by reaction of the acid with ethanolic hydrogen chloride under anhydrous conditions has been described previously (J. Am. Chem. Soc., 68, 1681 (1946); J. Poly. Sci., 3, 85 (1948)). This method which involves first, the preparation of E-aminocaproic acid in aqueous solution and the evaporation of relatively large quantities of water, is costly and time consuming, and is consequently a method which would not lend itself to practical operation on a commercial scale. In other procedures, relatively expensive intermediates such as ω-cyanovalerates and alkyl aldehydates (e.g., isopropyl adipaldehydate) have been proposed as sources for the desired esters of amino acids. The yields obtained in these prior art procedures are relatively low.

It is therefore an object of this invention to provide a process for the preparation of amino acid esters, and especially esters of E-aminocaproic acid, from their corresponding lactams by a single operation.

A still further object of this invention is to provide a process for the preparation of esters of E-amino-caproic acid in yields higher than have heretofore been obtained.

We have made the surprising discovery that esters of amino acids can be obtained in a practical and economical manner from the corresponding lactam in a single operation by reacting said lactam with the esterifying alcohol in the presence of a minor amount of water compared to the alcohol, and while passing into the reaction mixture, gaseous halogen acid.

In accordance with a preferred mode of carrying out the improved process of our invention, E-caprolactam is heated under reflux with an excess of the esterifying alcohol (when monohydric), and a molar equivalent (based on caprolactam) amount of water while passing a stream of hydrogen chloride through the mixture. After several hours, a solvent such as toluene, capable of forming an azeotrope with water is added, and the mixture is distilled to remove water and excess alcohol. The residue, the hydrochloride of E-aminocaproic acid ester, is generally a white solid and is obtained in yields of at least 80%, and often in excess of 90% of theory.

In an analogous manner lactams other than caprolactam can be used to prepare esters of corresponding amino acids other than E-aminocaproic acid. Examples of such lactams are pyrrolidone, N-methyl pyrrolidone, valerolactam, capryllactam, and enantholactam.

The term alcohol as used herein does not include phenols. Consequently, the alcohol used to provide the ester radical can be an alkyl, cycloalkyl, or aralkyl alcohol, which may be further substituted.

A temperature above about 100° C. is desirable in the ring opening phase of the process. Alcohols containing four or more carbon atoms, such as n-butanol, have been found to give high yields of product ester at atmospheric pressure by our novel process. Accordingly, we prefer to use an alcohol having four or more carbon atoms, and especially such alcohols boiling at 100° C. or more. As typical of the alcohols which are suitable for use in the process of this invention in accordance with the preferred manner of carrying it out, the following can be mentioned.

n-Butanol                Cyclohexanol
n-Hexanol                Ethylene glycol
2-Ethylhexanol           Decanol
n-Octanol                Benzyl alcohol
Lauryl alcohol           Phenethyl alcohol The gaseous halogen acid can be hydrogen chloride or hydrogen bromide. The amount of water can be varied somewhat from the preferred theoretical quantity required for the lactam ring opening. Since on esterification, water is formed, it is evident that less than the theoretical amount would be required as a minimum amount. Accordingly, the amount of water used should be substantial and is preferably within the range from about 0.6 to about 1.5 moles per mole of lactam used. With less than this minimum amount of water the reaction proceeds at a relatively slow rate while more than the above maximum would tend to interfere with the esterification reaction.

A water-insoluble organic compound capable of forming an azeotrope with water is added, preferably after the ring opening phase of the reaction, to the reaction mixture. This component assists in the removal of water and thus acts to improve the rate of esterification, especially when relatively large amounts of water are present.

Many alcohols, especially the higher boiling ones, are water insoluble and these can act as azeotropic agents. Preferably, non-reactive solvents for the ester, such as benzene and its non-reactive mono-, di-, and polysubstituted derivatives, such as toluene, chlorobenzene, nitrobenzene and the like are used as such agents because of their effectiveness, ready availability and cost.

The esters of amino acids produced by this novel process are obtained in the form of their halogen acid salts. The free bases can be obtained in any convenient manner as by dissolving the salts in water, adding a base such as caustic soda to neutralize the acid, and extracting the liberated amino acid ester with an organic solvent. Inasmuch as the free amino acid esters are somewhat unstable, it is more convenient and hence preferred to handle the halogen acid salt.

The lactam ring is opened initially by heating the lactam with water in the presence of the gaseous halogen acid. Inasmuch as the esterifying alcohol is present also, it follows that the esterification reaction will commence as soon as any of the acid is formed. Thus two reactions, the ring opening and the esterification occur concurrently, though at different rates. In general, the esterification reaction rate is retarded by the presence of water. Hence the removal of the latter component, which also is a product of the esterification reaction, by distillation, and preferably by azeotropic distillation serves to accelerate this reaction. On the other hand, removal of the water before the ring opening phase is completed retards this reaction. Therefore it is preferred to permit the ring opening step to proceed initially to substantial completion prior to facilitating the removal of water. We prefer initially to heat the mixture of lactam, water and alcohol in the presence of halogen acid at a temperature of 100° C. to 120° C. for several hours, at which time ring opening of the lactam is believed to be substantially complete, and thereafter to distill the water from the mixture. Pressures in the neighborhood of atmospheric can be employed.

The following examples will illustrate the improved process of our invention. Parts and percentages are by weight and temperatures are given in degrees centigrade.

*Example 1*

A mixture of 56.5 parts of E-caprolactam, 9 parts of water and 52 parts of n-butyl alcohol was heated under reflux for 6 hours while passing a steady stream of hydrogen chloride through the boiling mass. At the end of this time, the hydrogen chloride addition was terminated, and 45 parts of toluene were added to the reaction mixture. The mixture was then refluxed for about 16 hours, during which period water was separated from the condensate prior to returning it to the boiling mass. Thereafter, the mass was distilled under reduced pressure to remove toluene and the excess butyl alcohol. The residue of solid butyl-E-aminocaproate hydrochloride was washed with Skelly B (a mixture of petroleum hydrocarbons boiling in the pentane range), and then dried in a vacuum dessicator. The dried product weighed 110 parts, which is equivalent to a yield of 98.5% of theory.

*Example 2*

Following the procedure described in Example 1 above using 91.0 parts of 2-ethylhexanol in place of 52.0 parts of n-butyl alcohol, there was obtained 110 parts of 2-ethylhexyl-E-aminocaproate hydrochloride, as a semisolid which did not crystallize readily. This amount of product is equivalent to 79% of the theoretical yield.

*Example 3*

In an analogous manner to that described in Example 2 above, from 91.0 parts of n-octyl alcohol, there was obtained 130 parts (94% yield) of n-octyl-E-aminocaproate hydrochloride.

*Example 4*

By substituting 70.0 parts of cyclohexanol for 52.0 parts of n-butyl alcohol in the process described in Example 1 above, 105 parts, or 85% of theory, of cyclohexyl-E-aminocaproate hydrochloride were obtained.

*Example 5*

In a similar manner to that described in Example 1, except that 110.6 parts of n-decyl alcohol were used instead of n-butyl alcohol, there were obtained 141 parts (92% yield) of n-decyl-E-aminocaproate hydrochloride.

*Example 6*

The procedure of Example 1 was repeated using 130.0 parts of lauryl alcohol in place of butyl alcohol. The yield of lauryl-E-aminocaproate hydrochloride was 131 parts or 78% of theoretical yield.

*Example 7*

By substituting 75.6 parts of benzyl alcohol for 52.0 parts of n-butyl alcohol in the process described in Example 1 above, benzyl-E-aminocaproate hydrochloride is obtained.

*Example 8*

By substituting 15.5 parts of ethylene glycol for 52.0 parts of n-butyl alcohol in the process described in Example 1 above, ethylene bis-E-aminocaproate hydrochloride is obtained.

*Example 9*

In a similar manner to that described in Example 1, except that 42.5 parts of pyrrolidone are used in place of E-caprolactam, n-butyl γ-aminobutyrate hydrochloride is obtained.

It can thus be seen that a practical and efficient means has been devised to prepare esters of amino acids. Further, it will be readily appreciated that the above examples are given for purposes of illustration and that many variations in the specific details included therein will be readily apparent to those skilled in this art. Such variations are, it should be distinctly understood, included within the present invention, the scope of which is to be limited only by the appended claims.

We claim:

1. The improvement in the process of producing an alcohol ester of E-aminocaproic acid in the form of its salt of a halogen acid, from E-caprolactam, which comprises heating a mixture of the lactam, an alcohol selected from the group consisting of alkyl, cycloalkyl, and aralkyl mono- and dihydric alcohols having at least 4 carbon atoms and a boiling point of at least 100° C. and an amount of water equal to about 0.6 to about 1.5 mol per mol of lactam while maintaining a normally gaseous halogen acid in the reaction mixture until a reaction mixture containing E-aminocaproic acid, the alcohol, an E-aminocaproic ester of said alcohol, and its halogen acid salt is formed, adding an azeotropic agent to said reaction mixture, and heating the resulting mixture to remove the water by azeotropic distillation and to convert said E-aminocaproic acid to said ester.

2. The process as claimed in claim 1, wherein the azeotropic agent is selected from the group consisting of benzene and its non-reactive mono-, di-, and poly-substituted derivatives.

3. The process as claimed in claim 1, wherein the halogen acid is selected from the group consisting of hydrogen chloride and hydrogen bromide.

4. The process as claimed in claim 3, wherein the alcohol is a monohydric alkyl alcohol and the amount of water is about 1 mol per mol of lactam.

5. The process of producing an alcohol ester of E-aminocaproic acid in the form of its hydrochloride, from E-caprolactam, which comprises heating a mixture of the lactam, a monohydric alkyl alcohol having at least 4 carbon atoms, and an amount of water ranging from 0.6 to 1.5 mol per mol of lactam while maintaining hydrogen chloride in the mixture until a reaction mixture containing E-aminocaproic acid, the alcohol, the E-aminocaproic ester of said alcohol, and its hydrochloride is formed, adding an azeotropic agent to said reaction mixture, and heating the resulting mixture to remove the water by azeotropic distillation and to convert the E-aminocaproic acid to said ester, said azeotropic agent being selected from the group consisting of benzene and its non-reactive mono-, di-, and poly-substituted derivatives.

References Cited by the Examiner

UNITED STATES PATENTS 2,543,345   2/51   Waller et al. _____ 260—482

OTHER REFERENCES

Marvel et al., J.A.C.S., vol. 68, pages 1681–6 (1946).

LORRAINE A. WEINBERGER, *Primary Examiner.*

ABRAHAM H. WINKELSTEIN, DANIEL D. HORWITZ, LEON ZITVER, *Examiners.*